United States Patent
Kroeger et al.

(10) Patent No.: US 8,776,244 B2
(45) Date of Patent: Jul. 8, 2014

(54) SYSTEM AND METHOD FOR THE GENERATION OF A CONTENT FINGERPRINT FOR CONTENT IDENTIFICATION

(75) Inventors: David A. Kroeger, Tempe, AZ (US); Brian David Johnson, Portland, OR (US); Delia Grenville, Portland, OR (US); David B. Andersen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 11/963,928

(22) Filed: Dec. 24, 2007

(65) Prior Publication Data

US 2010/0313007 A1     Dec. 9, 2010

(51) Int. Cl.
*G06F 7/04* (2006.01)
*G06F 17/30* (2006.01)
*H04N 7/16* (2011.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| | | | |
|---|---|---|---|
| 7,013,301 B2 | 3/2006 | Holm et al. | |
| 7,707,157 B1 * | 4/2010 | Shen | 707/999.102 |
| 7,788,696 B2 | 8/2010 | Burges et al. | |
| 7,925,706 B2 | 4/2011 | Glickstein | |
| 2002/0126872 A1 | 9/2002 | Brunk et al. | |
| 2006/0036693 A1 | 2/2006 | Hulten et al. | |
| 2006/0188128 A1 * | 8/2006 | Rhoads | 382/100 |
| 2006/0218617 A1 | 9/2006 | Bradstreet et al. | |
| 2008/0040807 A1 * | 2/2008 | Lu et al. | 726/26 |
| 2008/0109369 A1 * | 5/2008 | Su et al. | 705/59 |
| 2008/0209502 A1 * | 8/2008 | Seidel | 726/1 |
| 2009/0005141 A1 * | 1/2009 | Lehtiniemi et al. | 463/9 |
| 2009/0077084 A1 * | 3/2009 | Svendsen | 707/9 |
| 2009/0324199 A1 * | 12/2009 | Haitsma et al. | 386/95 |
| 2010/0023499 A1 | 1/2010 | Johnson et al. | |

FOREIGN PATENT DOCUMENTS

| | | |
|---|---|---|
| EP | 2079030 A1 | 7/2009 |
| WO | 01/53965 A1 | 7/2001 |
| WO | 02/065782 A1 | 8/2002 |
| WO | 03/042867 A2 | 5/2003 |
| WO | 03/046760 A2 | 6/2003 |

OTHER PUBLICATIONS

Kieskowski, E. "EMusic and Relatable Team to Offer Open Source Audio Recognition Solution." Internet Citation. Posted Online on: Oct. 17, 2000, Webpage available at: http://www.streamingmedia.com/Articles/ReadArticle.aspx?ArticleID=63237.

(Continued)

*Primary Examiner* — Kambiz Zand
*Assistant Examiner* — Benjamin Kaplan
(74) *Attorney, Agent, or Firm* — Garrett IP, LLC

(57) ABSTRACT

A system and method for the generation of a content fingerprint for content identification are described. Various embodiments include encoding content without any available identifying information, performing a technical analysis of the encoded content for one or more technical attributes, and pairing the available identifying information with the one or more technical attributes to form a content fingerprint, where the content fingerprint identifies the content. Other embodiments are described and claimed.

20 Claims, 4 Drawing Sheets

(56) References Cited

OTHER PUBLICATIONS

William, et al., "Method of recognizing duplicates in received information," Research Disclosure, Mason Publications, Hampshire, GB: vol. 440(45), Dec. 1, 2000, 1 page.

European Search Report received for European Patent Application No. 08171400.8, mailed on Jun. 9, 2009, 8 pages.

Robinson, Sara. "Can Napster Block Infringement?" Interactive Week, Nov. 24, 2000; pp. 1-4.

Office Action received for Chinese Patent Application No. 200810190309.6, mailed on May 17, 2011, 7 pages of Office Action including 4 pages of English Translation.

Office Action received for Chinese Patent Application No. 200810190309.6, mailed on Sep. 2, 2010, 4 pages of Office Action including 1 page of English Translation.

Swartz, A, "Musicbrainz: a Semantic Web Service," IEEE Intelligent Systems, IEEE Service Center, New York, US: vol. 17 No. 1, Jan./Feb. 2002, pp. 76-77.

* cited by examiner

SYSTEM AND METHOD FOR THE GENERATION OF A CONTENT FINGERPRINT FOR CONTENT IDENTIFICATION

CROSS-REFERENCE TO RELATED APPLICATIONS

This application is related to U.S. patent application Ser. No. 11/963,926, filed on Dec. 24, 2007, and entitled "System and Method for a Content Fingerprint Filter," by inventors Brian David Johnson, et al.

BACKGROUND

The availability of digital content via an Internet Protocol (IP) connection provides a user with many options to choose from when the user is searching for content. Traditional content identification information may be associated with some of the available content to facilitate the user in searching for desirable content and/or filtering or blocking out undesirable content. Such content identification information may include meta-data tags, closed captioning, ratings, file information, Uniform Resource Locator (URL) links, and so forth.

The availability of the content identification information is typically dependent on the manual entry of this information by the content author or by a third party. Thus, much of the content that is available via an IP connection does not have associated identification information or the associated identification information is not correct. Here, the user will have to actually view or watch the content to understand the nature of the content.

DETAILED DESCRIPTION

Figure 1:
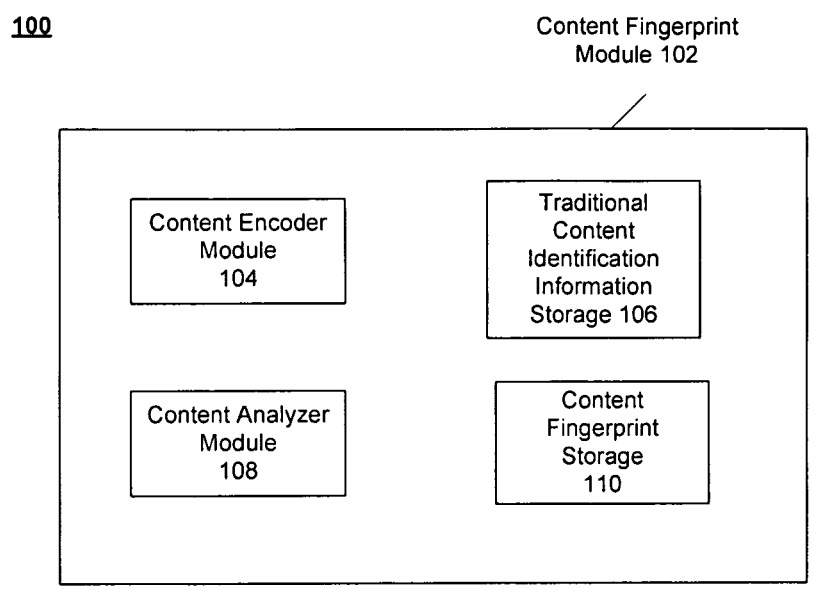
FIG. 1 illustrates one embodiment of a system.

Various embodiments may be generally directed to a system and method for the generation of a content fingerprint for content identification. As the availability of digital content grows, the ability for a user to search the available content for more precise selecting of desired content declines. While traditional content identification information (e.g., meta-data tags, closed captioning, ratings, file information, URL links, etc.) associated with some of the pieces of available content may assist the user in a filtered search of content, it is not a solution. Often times at least some of the pieces of available content either do not have any traditional content identification information associated with the content or this identification information is not correct. For example, user generated content and advertising content are often not associated with any means of content identification.

Embodiments of the invention are directed to a way of automatically providing content identification for most, if not all, pieces of available content. In embodiments, each piece of content is technically analyzed for a variety of technical attributes or a tagged output that assist in content identification. The technical analysis of content may be performed by one or more of a variety of well known content analysis techniques including, but not limited to, facial recognition, voice pattern recognition, logo recognition, audio analysis, voice analysis, video attribute recognition, and so forth. The example content analysis techniques are provided for illustration purposes only and are not meant to limit the invention. In fact, any means of content analysis may be used by embodiments of the invention.

In embodiments, for each piece of available content, the various content analysis techniques are used to produce an encrypted packet of technical attributes. For each piece of available content, its encrypted packet of technical attributes is paired with traditional content identification information (if available) to form a content fingerprint. The content fingerprint may then be used to assist in identifying the content. Each piece of content may then be categorized to provide more precise selecting by the user of the available content. Here, without having to actually view or watch the content to understand its nature, the user is able to better customize, search and/or define viewing preferences for available content. Other embodiments may be described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates an embodiment of a system 100. Referring to FIG. 1, system 100 may comprise a content fingerprint module 102. Module 102 may comprise a content encoder module 104, traditional content identification information storage 106, a content analyzer module 108 and content fingerprint storage 110. Each of these elements is described next in more detail.

The available content may be provided to content fingerprint module 102 in a variety of ways. For example, content may be provided via an IP connection, via a broadcast service, via another device connected to module 102 by a local area network (LAN), via a peer-to-peer (P2P) connection, and so forth.

The available content may be any type of content. Each piece of content may or may not have traditional content identification information associated with it. In various embodiments, the content may be media information. Examples of media information may generally include any data or signals representing information meant for a user, such as voice information, video information, audio information, image information, textual information, numerical information, alphanumeric symbols, graphics, and so forth. The embodiments are not limited in this context.

In embodiments, content encoder module 104 is used to encode each piece of available content. In embodiments, the encoded content does not include any available traditional content identification information. If one or more pieces of the content have traditional content identification information associated with it, then it may be stored in storage 106 for future access.

In embodiments, content encoder module 104 may include personal video recorder (PVR) functionality. PVR functionality records television data (i.e., requested content) in digital format (e.g., MPEG-1 or MPEG-2 formats) and stores the data in a hard drive or on a server, for example. The data may also be stored in a distributed manner such as on one or more connected devices throughout a home or office environment. In the case of digital media streams, the PVR functionality routes the previously encoded digital media stream to local storage. PVR functionality of module 104 may allow encoding of other types of data and other types of data may be added or substituted for those described as new types of data are developed. For example, content encoder module 104 may include the functionality to encode the content in such a way that technical analysis may be performed on the content. In embodiments, content may be viewed via a player (e.g., content fingerprint module 102) that is delivered via one or more of a variety of ways including, but not necessarily limited to, via web streaming, via downloading from an IP connection, a P2P connection, a Bluetooth connection, a wireless connection, and so forth.

In various embodiments, content analyzer module 108 performs a technical analysis of each piece of encoded content via one or more of the content analysis techniques described above (e.g., facial recognition, voice pattern recognition, logo recognition, audio analysis, voice analysis, video attribute recognition, and so forth). The technical analysis may result in a tagged output or one or more technical attributes for each piece of encoded content. Embodiments of the invention encrypt the technical attributes to form an encrypted packet of technical attributes. Here, each piece of encoded content has its own encrypted packet of technical attributes. The encryption of the technical attributes may be done for compression purposes. The encryption of the technical attributes may also be done for protection purposes so that the fingerprint cannot be altered or used by another not authorized to do so.

In embodiments, content analyzer module 108 performs the technical analysis on the pieces of content in a batched mode. In other embodiments, module 108 performs the technical analysis of the pieces of content in a real-time mode or in a mode that combines batched and real-time modes.

For each piece of encoded content, embodiments of content analyzer module 108 then pair the encrypted packet of technical attributes with its traditional content identification information (if available) to form a content fingerprint. The content fingerprints may then be stored in content fingerprint storage 110.

The content fingerprint may then be provided with its encoded content to a decoder. The decoder may use the content fingerprint to categorize the content for more precise selection of the available content by the user. For example, the decoder may be a media player.

Note that although the functionality of content fingerprint module 102 is described herein as being separated into four components, this is not meant to limit the invention. In fact, this functionality may be combined into three or less components or separated into five or more components.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 2:
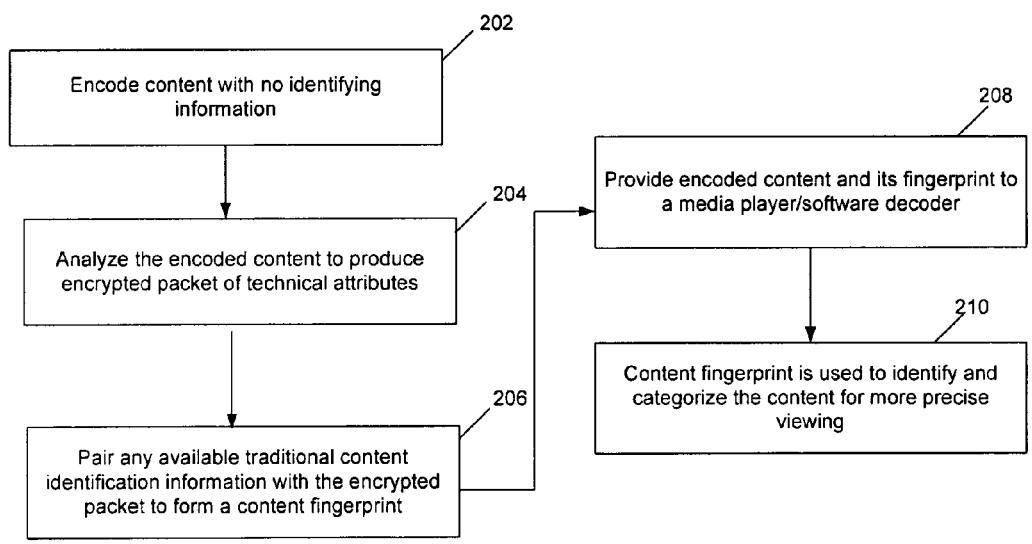
FIG. 2 illustrates one embodiment of a logic flow.

FIG. 2 illustrates one embodiment of a logic flow 200. As shown in logic flow 200, content is encoded with no identifying information (e.g., no traditional content identification information as described herein) (block 202). The encoded content is analyzed to produce technical attributes of the content. The technical attributes may then be encrypted to produce an encrypted packet (block 204). The encrypted packet and any available traditional content identification information are paired to form a content fingerprint (block 206). The content fingerprint and its associated encoded content are provided to decoder (block 208). The content fingerprint may be used to identify and categorize the content (block 210). Here, without having to actually view or watch the content to understand its nature, the user is able to better customize, search and/or define viewing preferences for available content.

Figure 3:
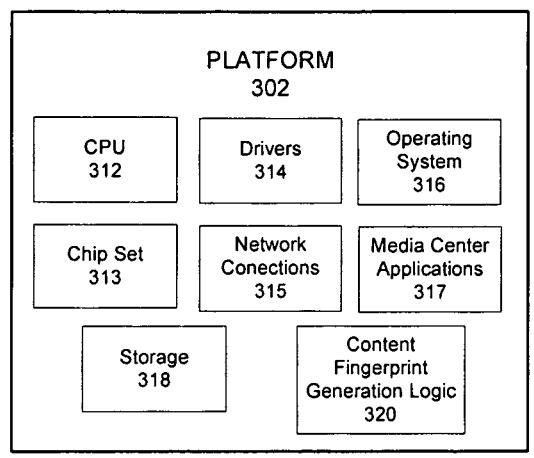
FIG. 3 illustrates one embodiment of a system.

FIG. 3 illustrates an embodiment of a platform 302 (e.g., content fingerprint module 102 from FIG. 1). In one embodiment, platform 302 may comprise or may be implemented as a media platform 302 such as the Viiv™ media platform made by Intel® Corporation.

In one embodiment, platform 302 may comprise a CPU 312, a chip set 313, one or more drivers 314, one or more network connections 315, an operating system 316, and/or one or more media center applications 317 comprising one or more software applications, for example. Platform 302 may also comprise storage 318 and content fingerprint generation logic 320.

In one embodiment, CPU 312 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 313 may comprise any one of or all of the Intel® 945 Express Chipset family, the Intel® 955X Express Chipset, Intel® 975X Express Chipset family, plus ICH7-DH or ICH7-MDH controller hubs, which are all made by Intel® Corporation.

In one embodiment, drivers 314 may comprise the Quick Resume Technology Drivers made by Intel® to enable users to instantly turn on and off platform 302 like a television with the touch of a button after initial boot-up, when enabled, for example. In addition, chip set 313 may comprise hardware and/or software support for 5.1 surround sound audio and/or high definition 7.1 surround sound audio, for example. Drivers 314 may include a graphics driver for integrated graphics platforms. In one embodiment, the graphics driver may comprise a peripheral component interconnect (PCI) Express graphics card.

In one embodiment, network connections 315 may comprise the PRO/1000 PM or PRO/100 VE/VM network connection, both made by Intel® Corporation.

In one embodiment, operating system 316 may comprise the Windows® XP Media Center made by Microsoft® Corporation. In other embodiments, operating system 316 may comprise Linux®, as well as other types of operating systems. In one embodiment, one or more media center applications 317 may comprise a media shell to enable users to interact with a remote control from a distance of about 10-feet away from platform 302 or a display device, for example. In one embodiment, the media shell may be referred to as a "10-feet user interface," for example. In addition, one or more media center applications 317 may comprise the Quick Resume Technology made by Intel®, which allows instant on/off functionality and may allow platform 302 to stream content to media adaptors when the platform appears to the user to be turned "off."

In one embodiment, storage 318 may comprise the Matrix Storage technology made by Intel® to increase the storage performance and provide enhanced protection for valuable digital media when multiple hard drives are included. In one embodiment, content fingerprint generation logic 320 is used to enable the functionality of the invention as described herein. The embodiments, however, are not limited to the elements or in the context shown or described in FIG. 3.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
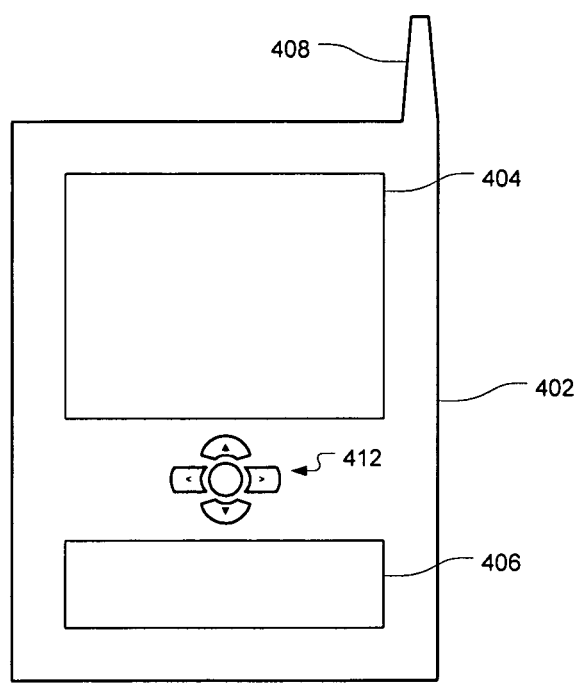
FIG. 4 illustrates one embodiment of a device.

FIG. 4 illustrates one embodiment of a device 400 in which functionality of the present invention as described herein may be implemented. In one embodiment, for example, device 400 may comprise a communication system. In various embodiments, device 400 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, and so forth. The embodiments are not limited in this context.

In one embodiment, device 400 may be implemented as part of a wired communication system, a wireless communication system, or a combination of both. In one embodiment, for example, device 400 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 400 may comprise a housing 402, a display 404, an input/output (I/O) device 406, and an antenna 408. Device 400 also may comprise a five-way navigation button 412. I/O device 406 may comprise a suitable keyboard, a microphone, and/or a speaker, for example. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   encoding, via a first electronic processing system, content, wherein the encoded content lacks traditional content identifying information;
   performing, via the first electronic processing system, a technical analysis of the encoded content for one or more technical attributes, wherein the technical analysis includes one or more of voice pattern recognition or voice analysis; and
   pairing, via the first electronic processing system, previously stored traditional content identifying information with the one or more technical attributes to form a content fingerprint, wherein the traditional content identifying information is stored separate from the content and the content fingerprint identifies the content.

2. The method of claim 1, wherein the one or more technical attributes are encrypted to form an encrypted packet and the traditional content identifying information is paired with the encrypted packet to form the content fingerprint.

3. The method of claim 1, wherein the technical analysis further includes at least one of logo recognition, facial recognition, audio analysis, and video attribute recognition.

4. The method of claim 1, wherein the traditional content identifying information includes at least one of meta-data tags, closed captioning, ratings, and a Uniform Resource Locator (URL) link.

5. The method of claim 1, further comprising receiving the content via an Internet Protocol (IP) connection.

6. The method of claim 1, further comprising receiving the content via at least one of a peer-to-peer (P2P) connection, a Bluetooth connection and a wireless connection.

7. The method of claim 1, further comprising:
   using, via a second electronic processing system, the content fingerprint to categorize the content for precise selectivity by a user of the content.

8. A system, comprising:
   a content encoder configured to operate via a first electronic processing system and to encode content to form encoded content, wherein the encoded content lacks traditional content identifying information;
   a memory configured to operate via the first electronic processing system and to store traditional content identifying information separate from the content; and
   a content analyzer configured to operate via the first electronic processing system and to perform a technical analysis of the encoded content for one or more technical attributes and to pair the stored traditional content identifying information with the one or more technical attributes to form a content fingerprint, wherein the technical analysis includes one or more of voice pattern recognition or voice analysis, and wherein the content fingerprint identifies the content.

9. The system of claim 8, wherein the content analyzer is configured to encrypt the one or more technical attributes to form an encrypted packet and to pair the traditional content identifying information with the encrypted packet to form the content fingerprint.

10. The system of claim 8, wherein the technical analysis further includes at least one of logo recognition, facial recognition, audio analysis, and video attribute recognition.

11. The system of claim 8, wherein the traditional content identifying information includes at least one of meta-data tags, closed captioning, ratings, and a Uniform Resource Locator (URL) link.

12. The system of claim 8, wherein the content encoder is configured to receive the content via an Internet Protocol (IP) connection.

13. The system of claim 8, wherein the content encoder is configured to receive the content via at least one of a peer-to-peer (P2P) connection, a Bluetooth connection and a wireless connection.

14. The system of claim 8, further comprising:
   a decoder configured to operate via a second electronic processing system and to use the content fingerprint to categorize the content for precise selectivity by a user of the content.

15. A machine-readable storage medium containing instructions which, when executed by a processing system, cause the processing system to perform a method, the method comprising:

encoding content, wherein the encoded content lacks traditional content identifying information;

performing a technical analysis of the encoded content for one or more technical attributes, wherein the technical analysis includes one or more of voice pattern recognition or voice analysis; and pairing previously stored traditional content identifying information with the one or more technical attributes to form a content fingerprint, wherein the traditional content identifying information is stored separate from the content and the content fingerprint identifies the content.

16. The machine-readable storage medium of claim 15, wherein the one or more technical attributes are encrypted to form an encrypted packet and the traditional content identifying information is paired with the encrypted packet to form the content fingerprint.

17. The machine-readable storage medium of claim 15, wherein the technical analysis further includes at least one of logo recognition, facial recognition, audio analysis, and video attribute recognition.

18. The machine-readable storage medium of claim 15, wherein the traditional content identifying information includes at least one of meta-data tags, closed captioning, ratings, and a Uniform Resource Locator (URL) link.

19. The machine-readable storage medium of claim 15, further comprising receiving the content via an Internet Protocol (IP) connection.

20. The machine-readable storage medium of claim 15, further comprising receiving the content via at least one of a peer-to-peer (P2P) connection, a Bluetooth connection and a wireless connection.

* * * * *